United States Patent
Tsou et al.

(10) Patent No.: US 9,811,242 B2
(45) Date of Patent: Nov. 7, 2017

(54) EYE-CONTROLLED PASSWORD INPUT APPARATUS, METHOD AND COMPUTER-READABLE RECORDING MEDIUM AND PRODUCT THEREOF

(71) Applicant: UTECHZONE CO., LTD., New Taipei (TW)

(72) Inventors: Chia-Chun Tsou, New Taipei (TW); Po-Tsung Lin, New Taipei (TW)

(73) Assignee: Utechzone Co., Ltd., New Taipei (TW)

( * ) Notice: Subject to any disclaimer, the term of this patent is extended or adjusted under 35 U.S.C. 154(b) by 92 days.

(21) Appl. No.: 14/622,181

(22) Filed: Feb. 13, 2015

(65) Prior Publication Data

US 2015/0347733 A1 Dec. 3, 2015

(30) Foreign Application Priority Data

May 30, 2014 (TW) .............................. 103118991 A

(51) Int. Cl.
*G06F 21/32* (2013.01)
*G06K 9/00* (2006.01)
(Continued)

(52) U.S. Cl.
CPC ............ *G06F 3/0482* (2013.01); *G06F 3/013* (2013.01); *G06F 21/31* (2013.01); *G06K 9/00597* (2013.01)

(58) Field of Classification Search
CPC ........ G06F 21/32; G06F 3/0482; G06F 3/013; G06K 9/00597
(Continued)

(56) References Cited

U.S. PATENT DOCUMENTS 7,746,235 B2 6/2010 Hammoud et al.
7,986,816 B1* 7/2011 Hoanca .............. G06K 9/00597
382/115
(Continued)

FOREIGN PATENT DOCUMENTS

CN 103077338 A 5/2013
TW 201344597 A 11/2013

OTHER PUBLICATIONS

Manu Kumar, Tal Garfinkel, Dan Boneh, Terry Winograd. Reducing Shoulder-surfing by Using Gaze-based Password Entry. May 2007. Stanford University, Stanford, CA. pp. 1-7.*
(Continued)

*Primary Examiner* — William Powers
*Assistant Examiner* — Aubrey Wyszynski
(74) *Attorney, Agent, or Firm* — Muncy, Geissler, Olds & Lowe, P.C.

(57) ABSTRACT

The present invention provides an eye-controlled password input apparatus, which comprises a display device to display a password menu, an image capturing device to capture an user's eye region image, a memory unit to store at least one preset password and a corresponding account number, a control unit to generate the password menu according to the preset password, and an image processing unit. The image processing unit obtains a plurality of reference objects from the eye image so as to recognize the eye movement direction and to confirm password input. After input a character of the password, the display device generates another password selection menu for the user to input another password character until the password input program is completed.

21 Claims, 15 Drawing Sheets

(51) Int. Cl.
   *G06F 3/0482*   (2013.01)
   *G06F 3/01*     (2006.01)
   *G06F 21/31*    (2013.01)
(58) Field of Classification Search
   USPC .......................................................... 726/18
   See application file for complete search history.

(56) References Cited

U.S. PATENT DOCUMENTS

| | | | |
|---|---|---|---|
| 8,487,875 B1 * | 7/2013 | Medina, III | G06F 3/0236 345/168 |
| 2011/0060912 A1 * | 3/2011 | Dai | G06F 21/31 713/183 |
| 2014/0099919 A1 * | 4/2014 | Ailaney | H04L 51/14 455/410 |

OTHER PUBLICATIONS

Facebook, Pixnet Blog, Feb. 24, 2012, http://web.archive.org/web/20120224173537/http://dinosaurs.pixnet.net/blog/post/36028368.

* cited by examiner

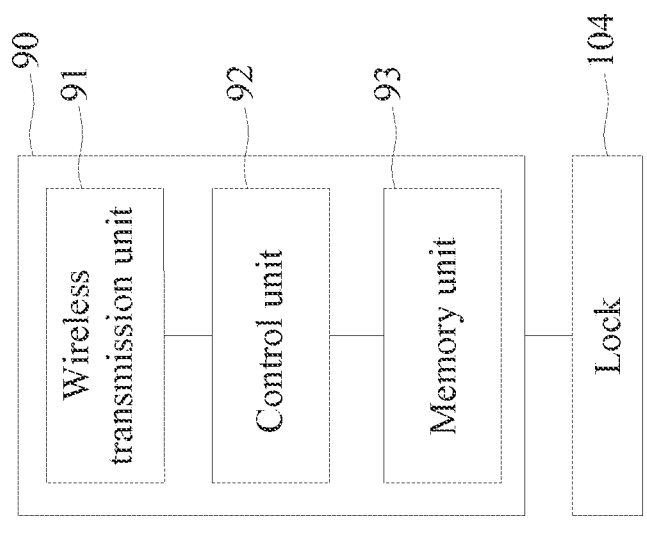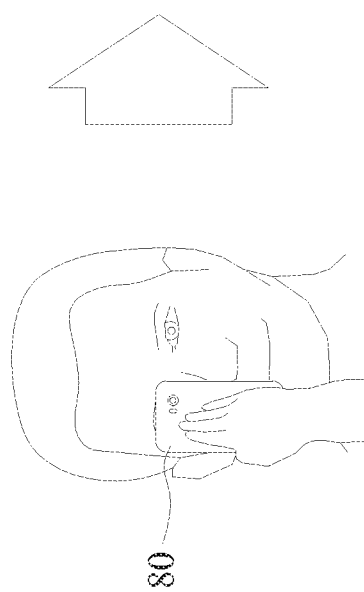
FIG.5

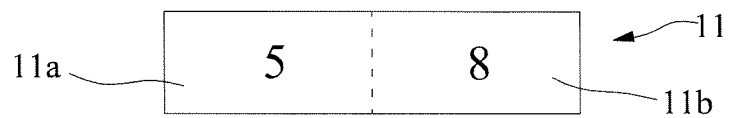
FIG.7( a )
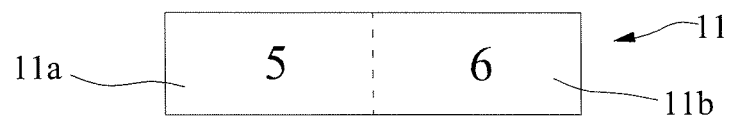
FIG.7( b )
FIG.7( c )
FIG.7( d )
FIG.7( e )
FIG.7( f )

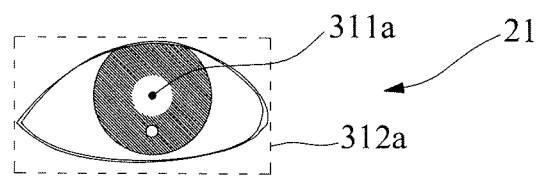
FIG.8( a )
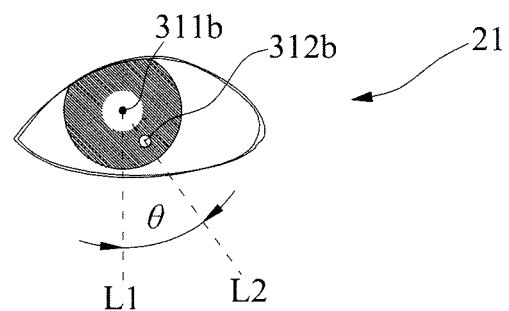
FIG.8( b )
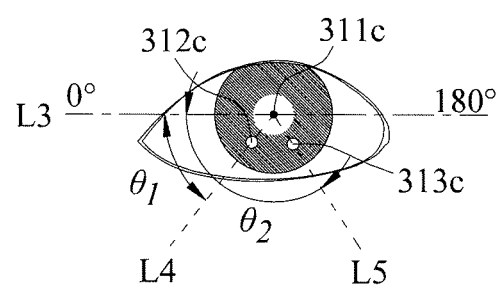
FIG.8( c )

EYE-CONTROLLED PASSWORD INPUT APPARATUS, METHOD AND COMPUTER-READABLE RECORDING MEDIUM AND PRODUCT THEREOF

BACKGROUND OF THE INVENTION

1. Technical Field

The present invention relates to an eye-controlled password input apparatus and, more particularly, to an eye-controlled password input apparatus which generates input commands as data signals according to a user's eye movement.

2. Description of Related Art

Image recognition has found extensive application in various industries. In addition to identifying users' physical features, it enables a diversity of intuitive man-machine interactions, which lends uniqueness to the technology. For example, an eye-controlled electronic device based on image recognition can be operated by the movement of the user's eyeballs. This kind of operation not only is simple and convenient, but also provides enhanced security by eliminating the risks of leaving fingerprints behind—a drawback typical of the traditional key-pressing operation.

Conventionally, eyeball movement is detected by a precise positioning process which involves capturing the characteristic parts (e.g., the canthi, the pupils, etc.) of a user's eye images, establishing reference coordinates for the characteristic parts, and measuring the displacement of each characteristic part. Hence, when a conventional eye-controlled input apparatus is used for input, it must continuously track and update the characteristic parts of the user's eye images and, at the same time, map the locations of the characteristic parts to the coordinates on a display screen so as to determine the direction in which the user looks. The algorithm of the foregoing process, however, is very complicated and tends to prolong computation. It is therefore imperative to increase the convenience of operation of eye-controlled input apparatuses.

BRIEF SUMMARY OF THE INVENTION

The primary objective of the present invention is to simplify, and shorten the computation time of, the algorithm required in the prior art for determining where a user looks on a display device.

To solve the above problem, the present invention provides an eye-controlled password input apparatus, comprising: a display device for displaying a password menu, the password menu is divided into a plurality of display areas located at different positions, each of said display areas corresponding to_each of input password characters in the password menu; an image capturing device for taking an eye image of a user; a memory unit for storing at least one preset password and a corresponding account number; a control unit for generating the password menu according to each character of the preset password; and an image processing unit for obtaining a plurality of reference objects from the eye image and generating an eye movement direction according to the reference objects; wherein the image processing unit selects a corresponding display area according to the eye movement direction and thereby inputs one of said input password character; and wherein after the image processing unit inputs one of said input password characters in the password menu, the control unit automatically generates another one of the password menu on the display device according to next one of character in the preset password in order for the user to determine another one of said input password character until a password input process is completed.

Preferably, the reference objects comprise a pupil center and a an eye perimeter, and the image processing unit generates the eye movement direction by analyzing a relative position of the pupil center with respect to the eye perimeter.

Preferably, the reference objects comprise a pupil center and a light spot, and the image processing unit generates the eye movement direction by analyzing a relative position of the pupil center with respect to the light spot.

Preferably, the reference objects comprise a pupil center, a first light spot, and a second light spot, and the image processing unit calculates an area parameter and an angle parameter by analyzing the pupil center, the first light spot, and the second light spot and generates the eye movement direction according to the area parameter and the angle parameter.

Preferably, the eye-controlled password input apparatus further comprises an auxiliary light source device for illuminating an eye of the user so as to generate the light spot on a surface of the user's eye.

Preferably, the control unit generates at least one random password different from the preset password and simultaneously displays a character of the preset password and a corresponding character of the random password in the display areas of a corresponding said password menu.

Preferably, each said input password character is compared with a corresponding said character of the preset password; if a said input password character matches the corresponding character of the preset password, a current said password menu is automatically replaced by a next said password menu in order to enable subsequent input and comparison; and if all said input password characters sequentially match the characters of the preset password, the eye-controlled password input apparatus activates an unlocking operation.

Preferably, each said input password character is compared with a corresponding said character of the preset password, and if a said input password character does not match the corresponding character of the preset password, a current said password menu is automatically replaced by a next said password menu which does not show a corresponding said character of the preset password, nor will subsequent said password menu show corresponding said characters of the preset password respectively.

Preferably, the eye-controlled password input apparatus further comprises a handheld eye movement input device, wherein the handheld eye movement input device comprises a housing, a receiving space provided in the housing and configured for receiving the display device and the image capturing device, a master device containing the control unit, and a transmission line for data transmission between the master device and the display device or the image capturing device.

Preferably, the eye image includes an iris image, the memory unit pre-stores a plurality of iris templates, and the image processing unit compares the iris image against the iris templates and, if the iris image matches one of the iris templates, enables the display device to display a first said password menu.

Another aspect of the present invention is to provide an eye-controlled password input method by which a password input process is performed, comprising the steps of: (a) generating a password menu according to each character of preset password, and displaying the password menu on a display device, wherein the password menu is divided into a plurality of display areas located at different positions, and each of said display areas corresponds to each of an input password characters in the password menu; (b) taking an eye image of a user with an image capturing device, obtaining a plurality of reference objects from the eye image, and generating an eye movement direction according to the reference objects; (c) selecting one of the display areas according to the eye movement direction, and thereby identifying a said input password character; (d) generating automatically another_one of the password menu according to next one of character of the preset password in the step (c) in order for the user to determine another one of said input password character; and (e) repeating the steps (c) and (d) until the password input process is completed.

Preferably, the step (b) further comprises the steps of: searching for a pupil center in the eye image, and defining the pupil center as a first reference object; searching for a top end, a bottom end, a left end, and a right end of an eye in the eye image, generating with these ends a eye perimeter that encloses the eye, and defining the eye perimeter as a second reference object; and analyzing a relative position of the pupil center with respect to the eye perimeter to generate the eye movement direction.

Preferably, the step (b) further comprises the steps of: searching for a pupil center in the eye image, and defining the pupil center as a first reference object; searching for a light spot in the eye image, and defining the light spot as a second reference object; and analyzing a relative position of the pupil center with respect to the light spot to generate the eye movement direction.

Preferably, the step of generating the eye movement direction further comprises the steps of: defining a baseline passing through the pupil center; generating a connecting line connecting the pupil center and the light spot, and measuring an included angle between the baseline and the connecting line; and determining the relative position of the pupil center with respect to the light spot according to the included angle.

Preferably, the step (b) further comprises the steps of: searching for a pupil center, a first light spot, and a second light spot in the eye image, and defining the pupil center, the first light spot, and the second light spot as the reference objects; obtaining an area parameter according to the reference objects; obtaining an angle parameter according to the reference objects; and analyzing a geometric relationship between the area parameter and the angle parameter to generate the eye movement direction.

Preferably, the step of obtaining the area parameter further comprises the steps of: obtaining coordinates of the pupil center, coordinates of the first light spot, and coordinates of the second light spot, and calculating the area of a triangle defined by the three sets of coordinates; and dividing the area by a normalization factor to obtain the area parameter.

Preferably, the step of obtaining the angle parameter further comprises the steps of: defining a baseline passing through the pupil center; generating a first connecting line connecting the pupil center and the first light spot, and measuring a first included angle between the baseline and the first connecting line; generating a second connecting line connecting the pupil center and the second light spot, and measuring a second included angle between the baseline and the second connecting line; and generating the angle parameter according to the first included angle and the second included angle.

Preferably, the method further comprises the steps, to be performed prior to the step (a), of: obtaining an iris image from the eye image; performing an eigenvalue procedure on the iris image to obtain an iris eigenvector plot; and comparing the iris eigenvector plot against a plurality of iris templates, and starting the password input process from the step (a) if the iris eigenvector plot matches one of the iris templates, or leaving the password input process unexecuted if otherwise.

Preferably, the step (a) further comprises the steps of: generating at least one random password different from the preset password; and displaying simultaneously a character of the preset password and a corresponding character of the random password in the display areas of a corresponding said password menu.

Preferably, each said input password character is compared with a corresponding character of the preset password; if a said input password character matches the corresponding character of the preset password, a current said password menu is automatically replaced by a next said password menu in order to enable subsequent input and comparison; and if all said input password characters sequentially match the characters of the preset password, an unlocking operation is performed.

Preferably, each said input password character is compared with a corresponding character of the preset password, and if a said input password character does not match the corresponding character of the preset password, a current said password menu is automatically replaced by a next said password menu which does not show a corresponding said character of the preset password, nor will subsequent said password menu shows corresponding said characters of the preset password respectively.

Another aspect of the invention is to provide a_non-transitory computer readable medium, which is loadable and executable by a computer to execute the following steps: (a) generating a password menu according to each character of preset password, and displaying the password menu on a display device, wherein the password menu is divided into a plurality of display areas located at different positions, and each of said display areas corresponds to each of an input password characters in the password menu; (b) taking an eye image of a user with an image capturing device, obtaining a plurality of reference objects from the eye image, and generating an eye movement direction according to the reference objects; (c) selecting one of the display areas according to the eye movement direction, and thereby identifying a said input password character; (d) generating automatically another_one of the password menu according to next one of character of the preset password in the step (c) in order for the user to determine another one of said input password character; and (e) repeating the steps (c) and (d) until the password input process is completed.

Another aspect of the invention is to provide a computer program product is stored in a non-transitory computer readable medium, which is loadable and executable by a computer to execute the following steps: (a) generating a password menu according to each character of preset password, and displaying the password menu on a display device, wherein the password menu is divided into a plurality of display areas located at different positions, and each of said display areas corresponds to each of an input password characters in the password menu; (b) taking an eye image of a user with an image capturing device, obtaining a plurality of reference objects from the eye image, and generating an eye movement direction according to the reference objects; (c) selecting one of the display areas according to the eye movement direction, and thereby identifying a said input password character; (d) generating automatically another_one of the password menu according to next one of character of the preset password in the step (c) in order for the user to determine another one of said input password character; and (e) repeating the steps (c) and (d) until the password input process is completed.

BRIEF DESCRIPTION OF THE SEVERAL VIEWS OF THE DRAWINGS

FIG. 5 is outside view drawing of the third embodiment of the eye-controlled password input apparatus of the present invention.

FIG. 7(a) to FIG. 7 (f) are schematic drawings of the password menu of the present invention.

FIG. 8(a) to FIG. 8(c) are schematic drawings showing obtaining a first reference object and a second reference object from a user's eye image.

DETAILED DESCRIPTION OF THE INVENTION

The present invention provides an eye-controlled password input apparatus with which a password input process can be performed. Such password input processes are applicable to electronic locks (e.g., those of electronic safes) and identity verification systems (e.g., those for access control). The same processes can also be integrated with computer equipment to carry out digital verification. For example, one who requests access to a computer, machine, or database can perform the required password input process with the eye-controlled password input apparatus disclosed herein.

The present invention is hereinafter demonstrated by three embodiments, showing hardware to which the present invention is applicable.

First Embodiment

Figure 1:
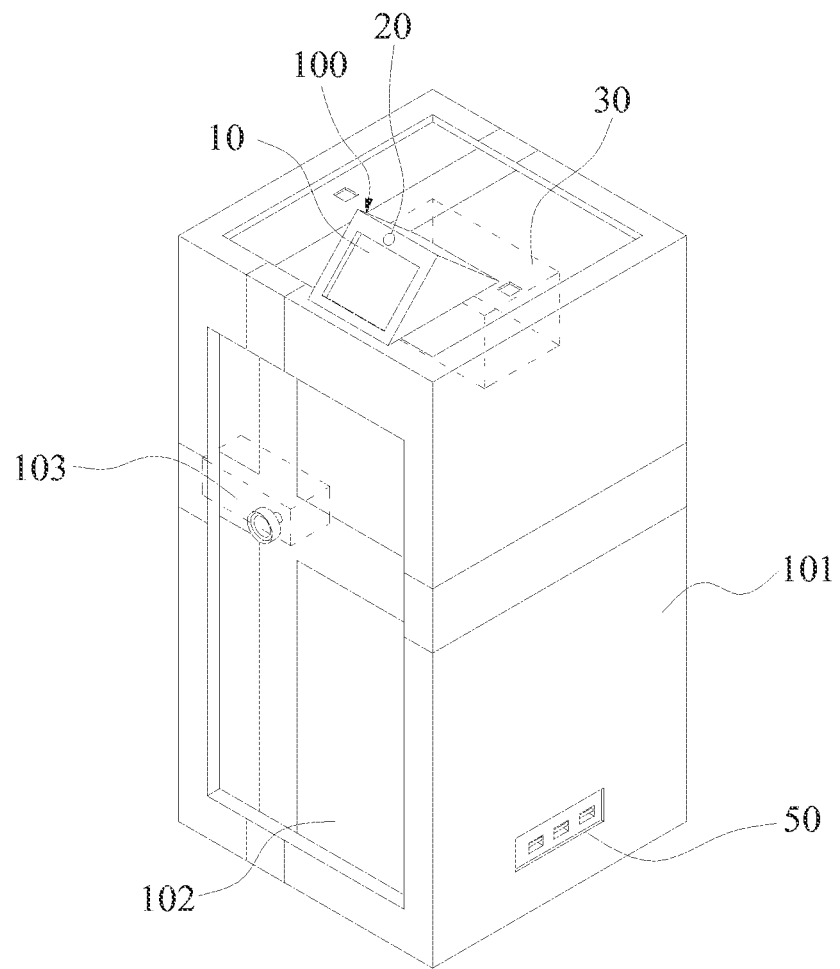
FIG. 1 is an outside view drawing of the first embodiment of the eye-controlled password input apparatus of the present invention.
Figure 2:
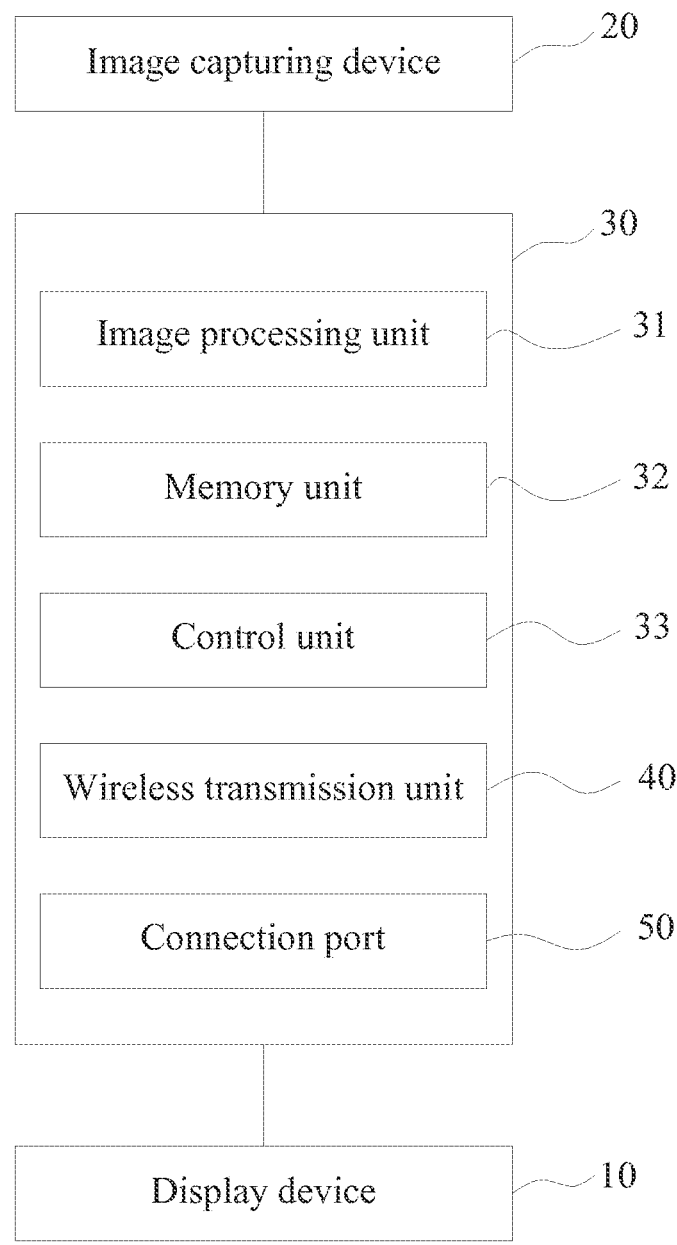
FIG. 2 is the function block diagram of the first embodiment of the present invention.

Please refer to FIG. 1 and FIG. 2 respectively for a perspective view and a function block diagram of the first embodiment of the eye-controlled password input apparatus of the present invention. As shown in the drawings, the eye-controlled password input apparatus 100 is applied to an eye-controlled safe which essentially includes a safe body 101, a door 102 provided on the safe body 101, and a lock 103 for controlling the door 102, in addition to the eye-controlled password input apparatus 100, which is provided on the safe body 101 and configured for controlling the lock 103.

The eye-controlled password input apparatus 100 includes a master device 30, a display device 10, and an image capturing device 20, the latter two of which are connected to the former. The display device 10 serves as a visual interaction interface between the eye-controlled password input apparatus 100 and its user and can be a liquid crystal display, a dot matrix light-emitting diode display, or the like. The image capturing device 20 can be a complementary metal-oxide-semiconductor (CMOS)-based image sensor, a charge-coupled device (CCD)-based image sensor, an infrared camera, or the like. The master device 30 includes an image processing unit 31, a memory unit 32, a control unit 33, a wireless transmission unit 40, and an optional connection port 50. The memory unit 32 pre-stores at least one preset password and an account number corresponding to the preset password. It is by this preset password that a person is determined as authorized to unlock or operate certain backend equipment or otherwise. The control unit 33 is configured for executing a password comparison algorithm, generating password menu according to the preset password, and controlling all I/O devices.

The image capturing device 20 takes images of one of the user's eyes in order for the image processing unit 31 to analyze the eye images and determine the user's looking direction or point of gaze. If the user inputs the correct password, the eye-controlled password input apparatus 100 will send out a signal to release an electronic lock, computer, or other hardware from the locked state. The master device 30 may be provided separately from the equipment to be controlled, or the master device 30 may be an integral part of the aforesaid electronic lock, computer, or other hardware. In short, the present invention imposes no limitations on the physical form of the master device 30. The image processing unit 31 is configured for obtaining a plurality of reference objects from the user's eye images and generating an eye movement direction according to the reference objects.

In one preferred embodiment, the image processing unit 31 is an image processing chip or is an image processing unit or graphics processor of a computer; the memory unit 32 is an electronic storage medium such as a hard disk drive, database, or cloud drive; and the control unit 33 is an electronic computation device such as a microprocessor or central processing unit (CPU).

In another preferred embodiment, the image processing unit 31, the memory unit 32, and the control unit 33 jointly constitute a computer or processor, such as a personal computer, workstation, host computer, or a computer or processor of still another form, to which no limitations are imposed by the present invention.

In yet another preferred embodiment, the image processing unit 31 and the control unit 32 jointly form a processor coupled to the memory unit 32. This processor can be a CPU, a programmable general-purpose or application-specific microprocessor, a digital signal processor (DSP), a programmable controller, an application-specific integrated circuit (ASIC), a programmable logic device (PLD), or the like, or a combination of the above.

Second Embodiment

Figure 3:
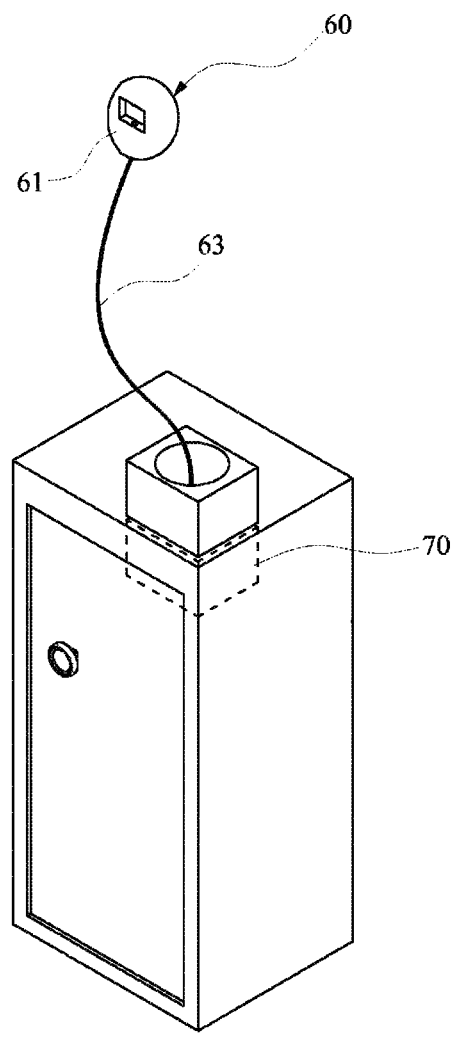
FIG. 3 is an outside view drawing of the second embodiment of the eye-controlled password input apparatus of the present invention.

Please refer to FIG. 3 for a perspective view of the second embodiment of the present invention. The eye-controlled safes in this embodiment and in the first embodiment have the same internal components, which, for the sake of simplicity, will not be described repeatedly. The second embodiment is distinguished from the first embodiment mainly by the interface for eye movement input. In the second embodiment, input into the safe is performed with a handheld eye movement input device 60.

Figure 4:
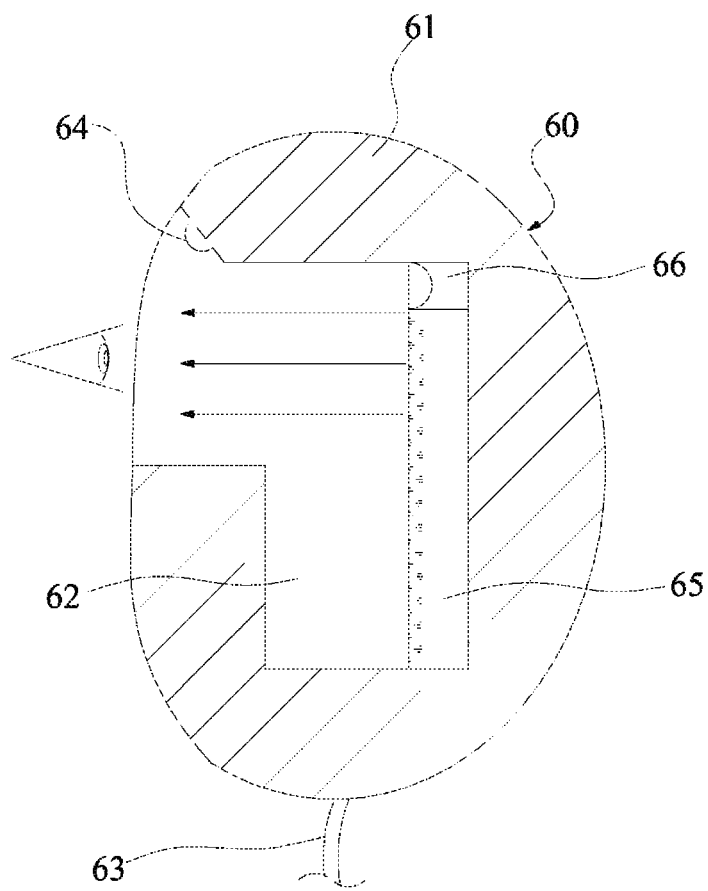
FIG. 4 is a cross section schematic drawing of the handheld eye movement input device of the present invention.

Referring to FIG. 4 for a sectional view of the handheld eye movement input device 60, the handheld eye movement input device includes a display device 65 and an image capturing device 66 and can be held by the user to cover one of his or her eyes during use. The handheld eye movement input device 60 further includes a housing 61, a receiving space 62 provided in the housing 61 and configured for receiving the display device 65 and the image capturing device 66, and a transmission line 63 for transmitting data between the master device 70 and the display device 65 or the image capturing device 66. As the handheld eye movement input device 60 can be directly placed over one of the user's eyes for eye-controlled input, the user does not have to physically adapt himself or herself to the eye-controlled input interface and bring one eye close to a display device or image capturing device provided at a fixed position (e.g., embedded in the safe or a wall). Thus, inconveniences which may otherwise result from differences in body shape are reduced. In addition, the housing 61 can minimize ambient light interference and over-exposure.

In the second embodiment, the handheld eye movement input device 60 can optionally be provided with an auxiliary light source device 64. A detailed description of the auxiliary light source device 64 and of how light spots are involved in image analysis will be given further below.

Third Embodiment

Please refer to FIG. 5 for a block diagram of the third embodiment of the present invention. The third embodiment discloses applying the eye-controlled password input apparatus of the present invention to an access control system. The access control system corresponds to a user's handheld mobile device 80 which doubles as an eye movement input interface. The handheld mobile device 80 has an image capturing device (not shown) capable of capturing the user's eye movement as the user inputs a password with one of his or her eyes. The handheld mobile device 80 can be, for example, a smart phone, smart tablet, wearable computer, or other like smart electronic device. The access control system essentially includes a master device 90 and a lock 104 connected to the master device 90 and configured for controlling the opening and closing of a door. The master device 90 includes a wireless transmission unit 91, a memory unit 93, and a control unit 92 connected to the wireless transmission unit 91 and the memory unit 93. The wireless transmission unit 91 can make wireless connection with the handheld mobile device 80 through radio frequency signals, infrared signals, Bluetooth signals, WiFi signals, ZigBee signals, or other similar wireless transmission means. The memory unit 93 pre-stores at least one preset password and an account number corresponding to the preset password. Whether the user is authorized to unlock or operate certain backend equipment is determined based on this preset password. The control unit 92 serves to perform a password comparison algorithm and control all I/O devices.

Figure 6:
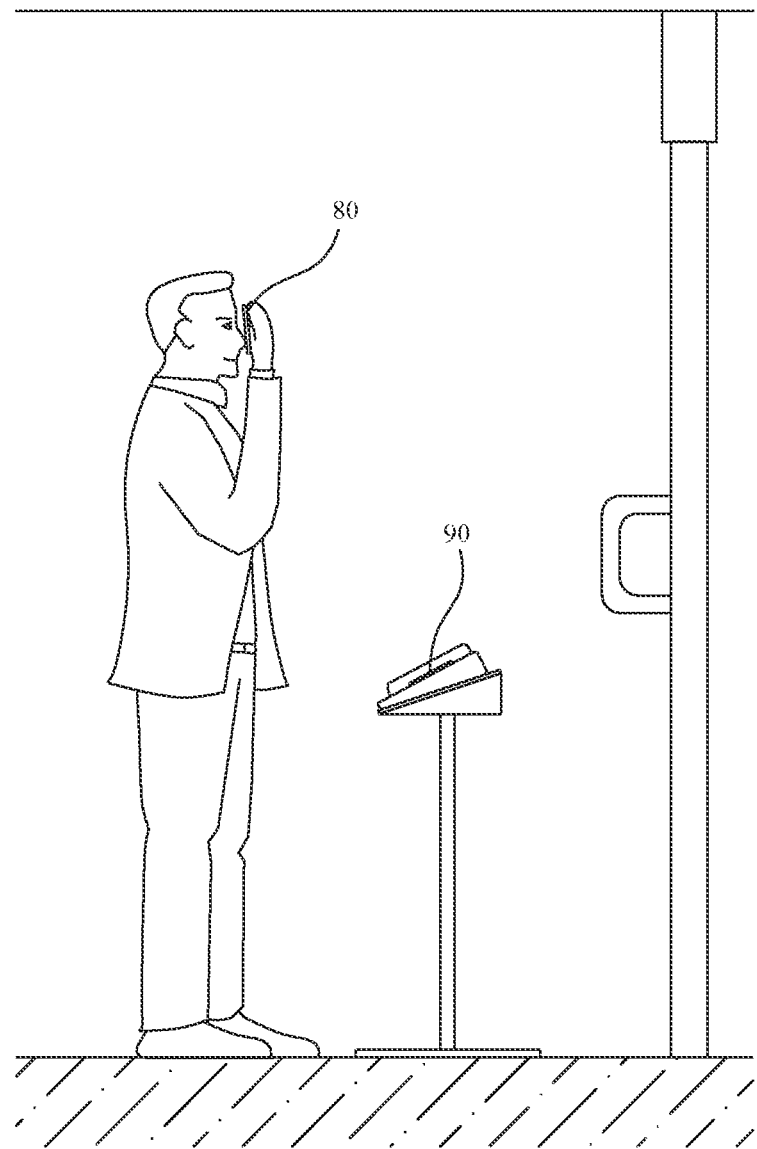
FIG. 6 is an operation schematic drawing of the third embodiment of the present invention.

Referring to FIG. 6 for a schematic drawing showing operation of the third embodiment of the present invention, the user covers one of his or her eyes with the handheld mobile device 80 so that the image capturing device of the handheld mobile device 80 can take images of the eye for further analysis to determine the user's looking direction or point of gaze. The control unit 92 compares the password input by the user with the preset password pre-stored in the memory unit 93. If the comparison result is a match, meaning the password input by the user is correct, the control unit 92 sends out a signal to release an electronic lock, computer, or other hardware from the locked state.

Referring back to FIG. 1 and FIG. 2 and to FIG. 7(a) through FIG. 7(f), the control unit 33 is so designed that it displays a password menu 11 on the display device 10, and the password menu 11 is divided into a plurality of display areas (e.g., display area 11a and display area 11b) located at different positions. Each display area corresponds to each of input password characters in the password menu so that the user can choose from the input password characters displayed in the password menu when inputting a password.

As the display areas are located at different positions on the password menu 11, the content that the user wishes to input can be known by the direction of the user's eye movement. To this end, the image capturing device 20 takes images of the user's eye, and the image processing unit 31 obtains a plurality of reference objects from the eye images and generates an eye movement direction according to the relative positions of the reference objects so that the content of the user's input can be identified and inputted. As used herein, the taint "reference object" refers to a characteristic of the eye in the user's eye images 21 (see FIG. 8). The reference objects serve as the basis on which to determine the user's eye movement direction. Once the display area corresponding to the user's eye movement direction is known, the input password character that the user is looking at can be identified and inputted. By repeating the foregoing process, the entire input password is obtained. According to the present invention, the directions of the user's eyeball movements are determined by observing the relative positions of the reference objects, without having to map the characteristics of the eye to the coordinate system of the display device 10 through coordinate conversion. Since there is no need to define the coordinates of the eye images 21 and convert the eye images into coordinates on the display device 10, the algorithm of the image processing unit 31 can be simplified to accelerate computation, as compared with the prior art.

To better illustrate the way in which the eye-controlled password input apparatus 100 of the present invention determines the user's eye movement directions, more embodiments are provided below with reference to FIG. 8(a) to FIG. 8(c), in which a right eye is shown and the arrows serve to indicate directions of eyeball movements. Please note that the terms "left" and "right" in the following description refer respectively to the left and right sides of the drawings rather than the left and right sides of the user.

Reference is now made to FIG. 8(a) to FIG. 8(c), which schematically show a plurality of reference objects obtained from the user's eye images 21. In one embodiment of the present invention, referring to FIG. 8(a), the pupil center 311a of the user's is defined as the first reference object, and a eye perimeter 312a, as the second reference object. As used herein, the term "eye perimeter" refers to a virtual frame which is found by lines tangent to the top end, bottom end, left end, and right end of the eye in a user's eye image and which therefore encloses the eye. If the pupil center 311a in the eye image 21 is moved toward the upper left corner of the eye image 21, the user is directing his or her look to an upper right display area in the password menu 11, so the content of this upper right display area is identified as the user's input. As the generation of the eye perimeter 312a may involve errors, threshold values should be properly set to reduce the chances of erroneous identification of the user's input.

In another embodiment of the present invention, referring to FIG. 8(b), the first reference object is the pupil center 311b of the user, and the second reference object is a light spot 312b. As used herein, the term "light spot 312b" refers to a spot of light formed by the surface of the user's eye reflecting the light of an external light source. Since the user moves only the eyeballs and is unlikely to move significantly during eye-controlled input, the location of the light spot 312b on the eye surface is substantially fixed and can therefore serve as a reference when determining the user's eye movement.

To generate the light spot 312b as a reference object, the handheld eye movement input device 60 of the eye-controlled password input apparatus 100 in FIG. 4 further includes an auxiliary light source device 64. The auxiliary light source device 64 is provided in the receiving space 62 and is so arranged as to cast light on the user's eye and generate the light spot 312b. The image processing unit 31 can analyze the relative position of the pupil center 311b with respect to the light spot 312b and thereby generate the eye movement direction. Preferably, the auxiliary light source device 64 is located within the handheld eye movement input device 60 in order to generate the light spot 312b on the surface of the user's eye. In this embodiment, the steps of determining the eye movement direction with reference to the light spot 312b are as follows. To begin with, a baseline L1 passing through the pupil center 311b is defined. The baseline L1 can be a vertical, horizontal, or otherwise oriented line in the user's eye image 21. Then, a connecting line L2 is defined which connects the pupil center 311b and the light spot 312b, and the included angle θ between the baseline L1 and the connecting line L2 is measured so as to determine the relative position of the pupil center 311b with respect to the light spot 312b according to the included angle θ.

In yet another embodiment of the present invention, referring to FIG. 8(c), three reference objects are obtained, namely the pupil center 311c of the user as the first reference object, a first light spot 312c as the second reference object, and a second light spot 313c as the third reference object. Moreover, an area parameter and an angle parameter are calculated based on the reference objects, and the geometric relationship between the area parameter and the angle parameter is analyzed to generate the eye movement direction. As used herein, the term "area parameter" refers to the area of the triangle defined by the coordinates of the pupil center 311c, of the first light spot 312c, and of the second light spot 313c. As the three vertices of a triangle define a circumcircle, moving only one vertex (e.g., the pupil center 311c) in the plane of the triangle and keeping the other two vertices (e.g., the first light spot 312c and the second light spot 313c) fixed in position will result in a circumcircle with a radius greater than that of the original circumcircle if the newly formed triangle has a smaller area than the original one, and it can be deduced that the greater the new radius is, the farther the user's eye has moved. In other words, the extent of the user's eye movement can be determined according to variation of the area parameter. However, should the user's head move forward or backward relative to the image capturing device, the value of the area parameter may be affected. To eliminate this variable, the present invention divides the above triangular area by a normalization factor which is equal to one half of the square of the distance between the first light spot 312c and the second light spot 313c, with a view to canceling out errors arising from the user's head movement. On the other hand, the term "angle parameter" as used herein refers to the angular relationship between the pupil center 311c, the first light spot 312c, and the second light spot 313c in a plane. More specifically, a baseline L3 is defined as a line passing through the pupil center 311c—vertically, horizontally, or otherwise—in the user's eye image 21. In addition, two connecting lines are generated, including a first connecting line L4 connecting the pupil center 311c and the first light spot 312c and a second connecting line L5 connecting the pupil center 311c and the second light spot 313c. Then, a first included angle θ1 between the baseline L3 and the first connecting line L4 and a second included angle θ2 between the baseline L3 and the second connecting line L5 are measured in order to generate the angle parameter according to the first and the second included angles θ1 and θ2. By combining the area parameter and the angle parameter, the extent and angle, and consequently the direction, of the user's eye movement can be known. In order to generate the first light spot 312c and the second light spot 313c as reference objects, the auxiliary light source device 64 for use in this embodiment has two light sources arranged in such a way as to cast light on the surface of the user's eye and generate the first light spot 312c and the second light spot 313c. The auxiliary light source device 64 is preferably provided within the handheld eye movement input device 60 so as to generate the light spot on the surface of the user's eye.

Generation of the password menu 11 is now detailed as follows. Please refer back to FIG. 7(a) to FIG. 7(f) for schematic drawings of the password menu 11 of the present invention. The password menu 11 is generated by the control unit 33 according to each character of the preset password in the memory unit 32. In one preferred embodiment, the control unit 33 generates at least one random password character different from the preset password and displays one character of the preset password and one character of the random password simultaneously in the password menu 11, allowing the user to perform selective input through eye control. In other words, when the user gazes at one of the display areas 11a and 11b, the eye-controlled password input apparatus 100 will determine that the content of the gazed-at display area is the content the user wishes to input. In the embodiment shown in FIG. 7(a) to FIG. 7 (f), the password menu 11 is divided into a left display area 11a and a right display area 11b. Assuming the preset password is "56723" and the random password is "85019", the control unit 33 sequentially instructs the display device 10 to show the related password menu 11. With the random password having the same number of characters as the preset password, the control unit 33 will generate as many password menu 11 as the number of characters. If only one random password is generated, each password menu 11 contains one character of the preset password and one character of the random password. More specifically, the control unit 33 begins by instructing the display device 10 to show the password menu 11 containing "5" (i.e., the first character of the preset password) and "8" (i.e., the first character of the random password), as shown in FIG. 7(a). After the user makes a selection, the control unit 33 generates the next password menu 11, which contains "6" (i.e., the second character of the preset password) and "5" (i.e., the second character of the random password), as shown in FIG. 7 (b). The above process repeats itself to show the third, fourth, and fifth characters of the preset password and of the random password. Once the user completes the password input process, the user's successive inputs are taken as the input password and are compared with the preset password in the memory unit 32 in order to determine whether the user is authorized to unlock or operate certain computer equipment.

In another embodiment of the present invention, each password character input by the user is immediately compared with the corresponding character of the preset password to determine the correctness of the input password character. More specifically, if an input password character matches the corresponding character of the preset password, the current password menu 11 will automatically refresh to show the next password menu 11 so that the remaining password characters can be sequentially input and compared. The unlocking operation will be performed if and only if all the input password characters are correct. Take FIG. 7(a) for example. If, from the two numbers "5" and "8" on the password menu 11, the user selects "5", which corresponds to the first character of the preset password, the control unit 33 will determine that the user has made the correct input and proceed to generate the following password menu 11, i.e., FIG. 7(b). The password menu 11 shown in FIG. 7(c) to FIG. 7(e) are successively generated in the same way and therefore will not be described repeatedly. Should a password character input by the user not match the corresponding character of the preset password, the current password menu 11 will still refresh automatically to show the next password menu 11, but this next password menu 11 and those that follow will not show subsequent characters of the preset password respectively. Taking FIG. 7(a) for example, if the user selects "8", which corresponds to the first character of the random password, the control unit 33 will determine the user's input as incorrect and begin to generate a password menu 11 which does not contain the next character of the preset password, such as the password menu 11 shown in FIG. 7(f), in which neither "2" nor "5" is the next character of the preset password. Consequently, the user is unable to input the following characters of the preset password and is thus prevented from obtaining the preset password by trial and error. Once the password input process is completed, however, the user can start the process all over again.

That is to say, in order to prevent the preset password from stealth via trial and error, the password menu generated by the control unit 33 after the user selects a character of the random password (i.e., inputs an incorrect password character) will contain nothing but a random content.

FIG. 9 through FIG. 14 show flowcharts of the eye-controlled password input method of the present invention.

Figure 9:
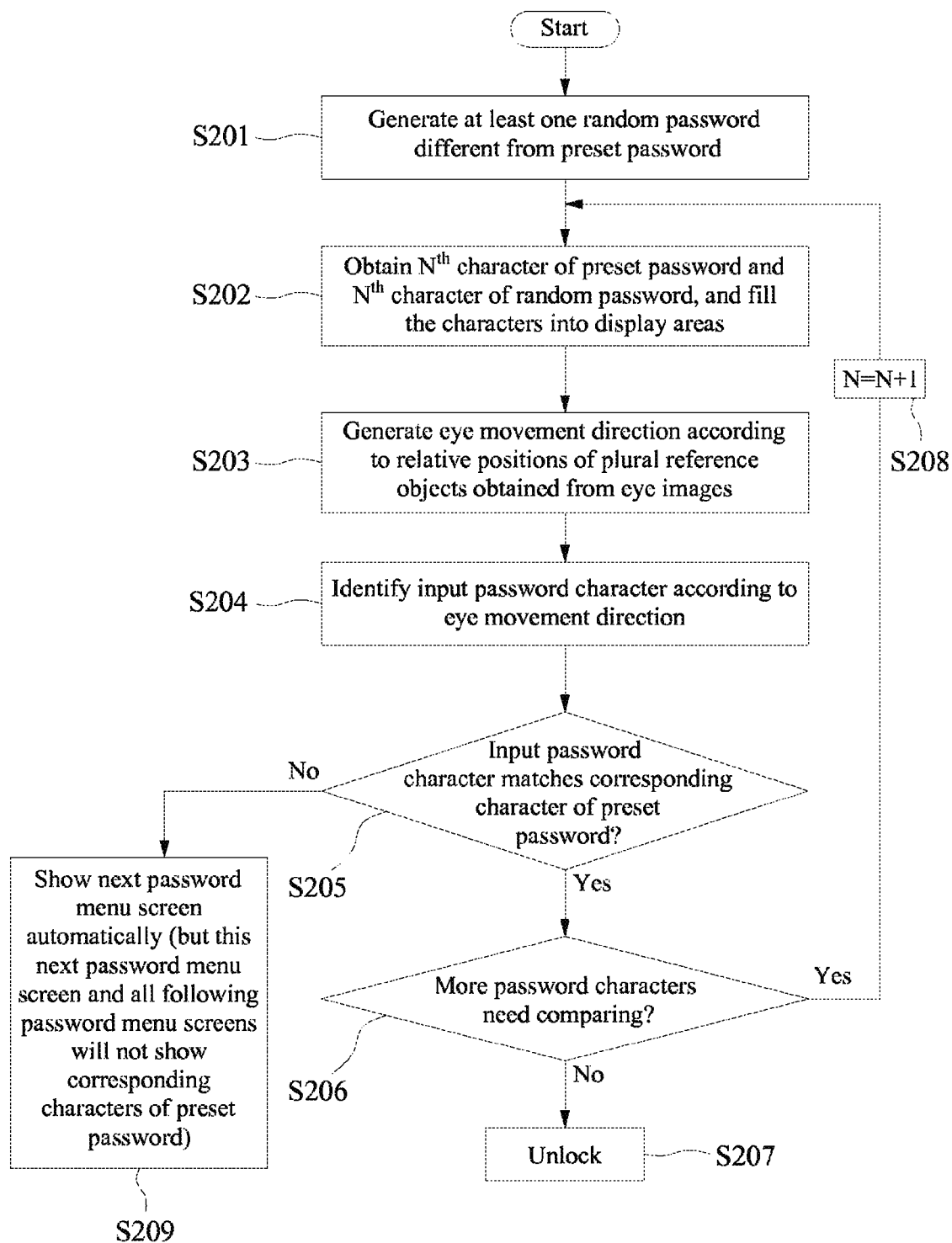
FIGS. 9 to 14 are flow chart showing the eye-controlled password input method of the present invention.

As shown in FIG. 9, the eye-controlled password input method of the present invention starts with generating at least one random password which is different from the preset password (step S201). The number of the random password(s) is determined by the number of display areas the password menu is subsequently divided into. For example, three random passwords will be generated if the password menu is to be divided into four display areas.

Following that, the $N^{th}$ character (the starting value of N being 1) of the preset password and the $N^{th}$ character of the random password are obtained, the password menu screen is divided into a plurality of display areas located at different positions, and the $N^{th}$ character of the preset password and the $N^{th}$ character of the random password are randomly filled into the display areas (step S202).

Then, a plurality of reference objects are obtained from the user's eye images, and an eye movement direction is generated according to the relative positions of the reference objects (step S203). Selection of the reference objects can be made according to the disclosure of the foregoing embodiments, and yet the present invention has no limitations in this regard.

Next, based on the eye movement direction, the corresponding display area of the password menu screen is selected, and an input password character is thus inputted (step S204).

Afterward, the input password character is compared with the corresponding character of the preset password (step S205). If the former matches the latter, it is further determined whether more password characters need comparing (step S206). If more password characters need comparing, make N=N+1 (step S208), and the process returns to step S202 to obtain the $N+1^{th}$ character of the preset password and the $N+1^{th}$ character of the random password and show the next password menu screen, allowing the user to input the next password character for comparison. This iterative process will continue as long as the input password character matches the corresponding character of the preset password. If no more characters need comparing, it is determined that the user is authorized to unlock, and an unlocking step (step S207) follows.

If it is determined in step S205 that the input password character does not match the corresponding character of the preset password, the current password menu screen will still refresh automatically to show the next password menu screen. However, the refreshed password menu screen and all the following password menu screens will not show subsequent characters of the preset password but show randomly generated characters for the user to choose from (step S209).

Figure 10:
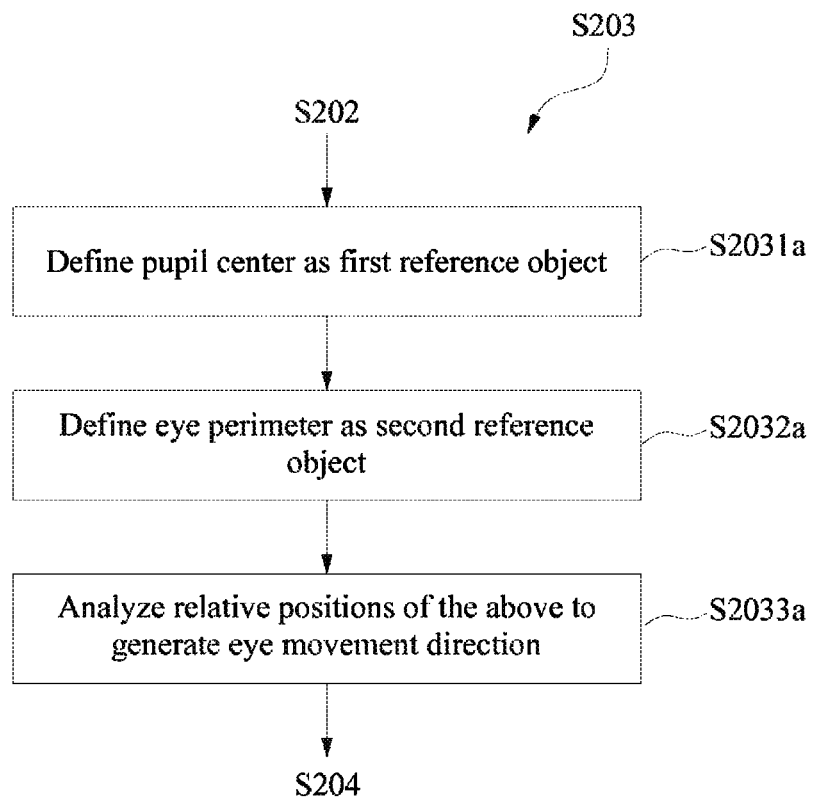

According to preferred embodiments of the present invention, step S203 can be performed in any of the following ways to obtain the eye movement direction:

Referring to FIG. 10 in conjunction with FIG. 8(a), the first way to obtain the eye movement direction begins with searching for the pupil center 311a in the user's eye image 21 and defining the pupil center 311a as the first reference object (step S2031a). The next step is to search for the top end, bottom end, left end, and right end of the eye in the user's eye image, to generate a eye perimeter 312a with the four ends such that the eye perimeter 312a encloses the eye, and to define the eye perimeter 312a as the second reference object (step S2032a). Then, the relative position of the pupil center 311a with respect to the eye perimeter 312a is analyzed to generate the eye movement direction (step S2033a).

Figure 11:
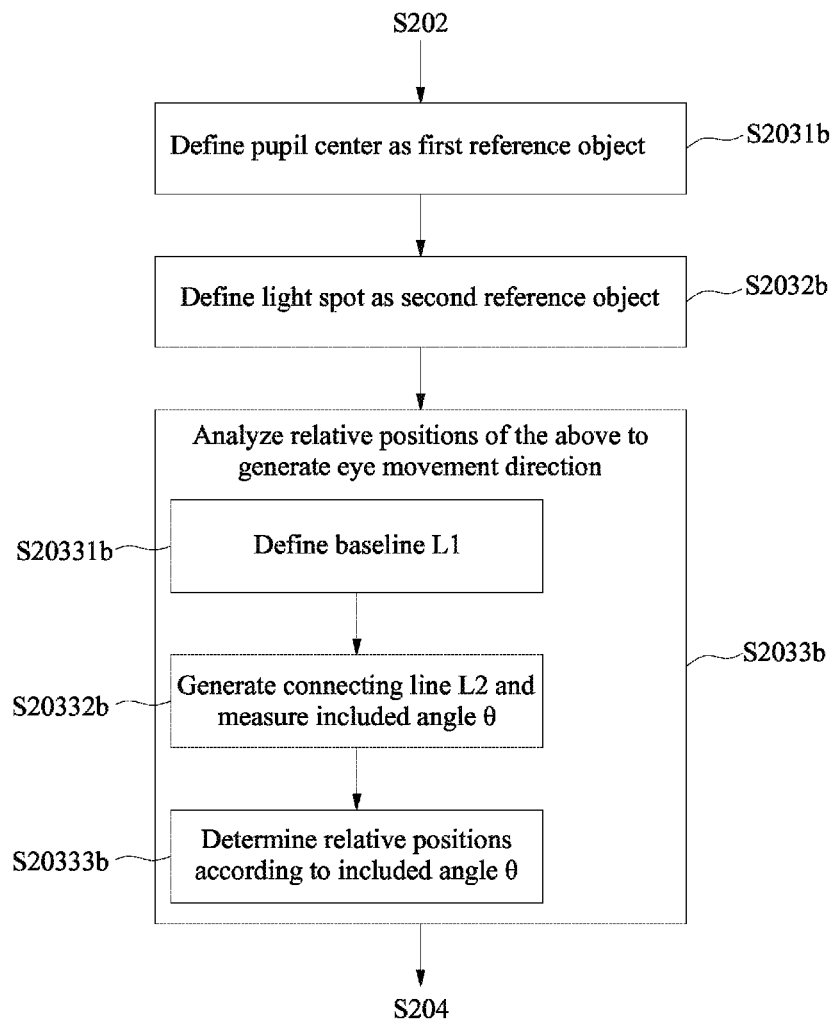

The second way to obtain the eye movement direction is now described with reference to FIG. 11 in conjunction with FIG. 8(b). The first step is to search for the pupil center 311b in the user's eye image and define the pupil center 311b as the first reference object (step S2031b). The next step is to search for a light spot 312b in the user's eye image and define the light spot 312b as the second reference object (step S2032b). Then, the relative position of the pupil center 311b with respect to the light spot 312b is analyzed to generate the eye movement direction (step S2033b). Step S2033b further includes the steps of: defining a baseline L1 passing through the pupil center 311b (step S20331b); generating a connecting line L2 which connects the pupil center 311b and the light spot 312b and measuring an included angle θ between the baseline L1 and the connecting line L2 (step S20332b); and determining the relative positions of the pupil center 311b and the light spot 312b according to the included angle θ (step S20333b).

Figure 12:
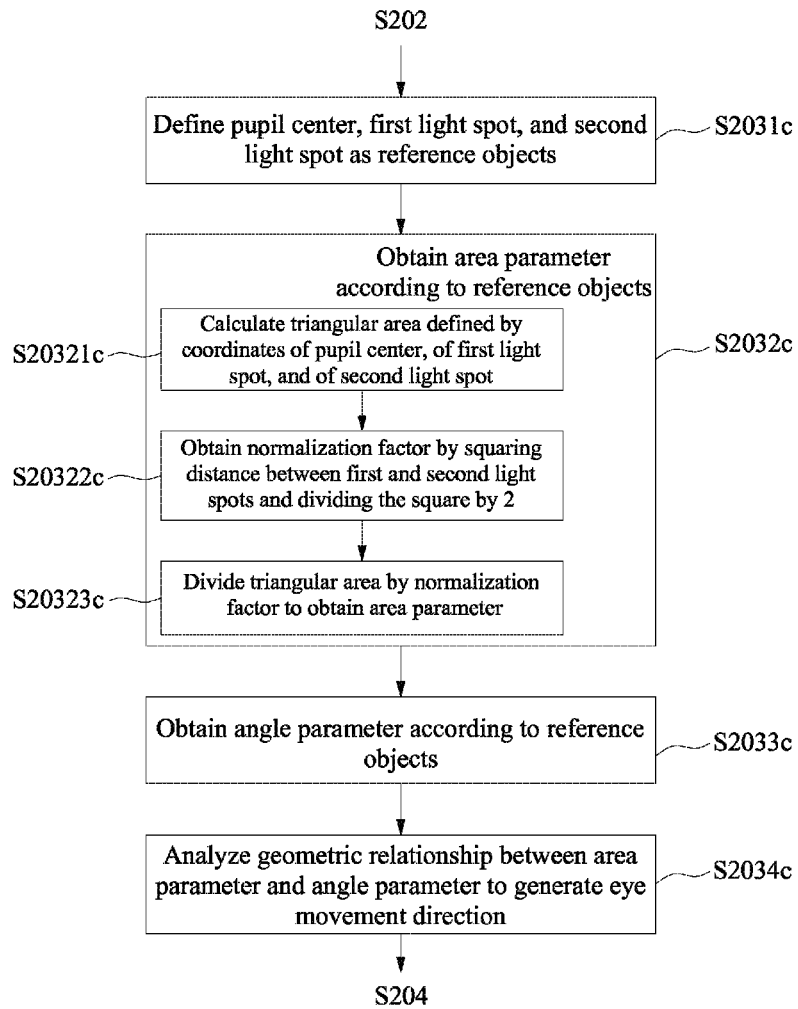
Figure 13:
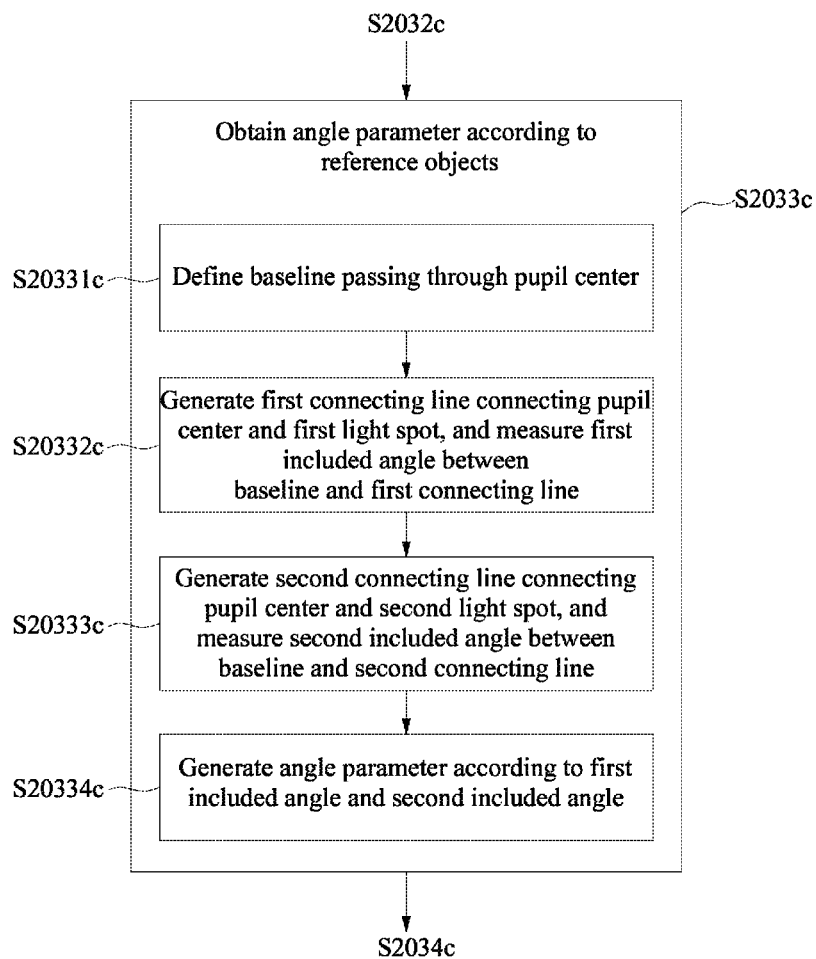

The third way to obtain the eye movement direction, referring to FIG. 12 and FIG. 13 in conjunction with FIG.

8(c), is carried out by: searching for the pupil center 311c, a first light spot 312c, and a second light spot 313c in the user's eye image as the reference objects (step S2031c); obtaining an area parameter according to the reference objects (step S2032c); obtaining an angle parameter according to the reference objects (step S2033c); and analyzing the geometric relationship between the area parameter and the angle parameter to generate the eye movement direction (step S2034c). In step S2032c, the area parameter is obtained by: calculating the coordinates of the pupil center 311c, of the first light spot 312c, and of the second light spot 313c and calculating the area of the triangle defined by the three sets of coordinates (step S20321c); calculating the distance between the first light spot 312c and the second light spot 313c, squaring the distance, and dividing the square by 2 to obtain a normalization factor (step S20322c); and dividing the area of the triangle by the normalization factor to obtain the area parameter (step S20323c). On the other hand, referring to FIG. 13 in conjunction with FIG. 8(c), step S2033c for obtaining the angle parameter is carried out by: defining a baseline L3 which passes through the pupil center 311c (step S20331c); generating a first connecting line L4 which connects the pupil center 311c and the first light spot 312c and measuring the first included angle θ1 between the baseline L3 and the first connecting line L4 (step S20332c); generating a second connecting line L5 which connects the pupil center 311c and the second light spot 313c and measuring the second included angle θ2 between the baseline L3 and the second connecting line L5 (step S20333c); and generating the angle parameter according to the first included angle θ1 and the second included angle θ2 (step S20334c).

Figure 14:
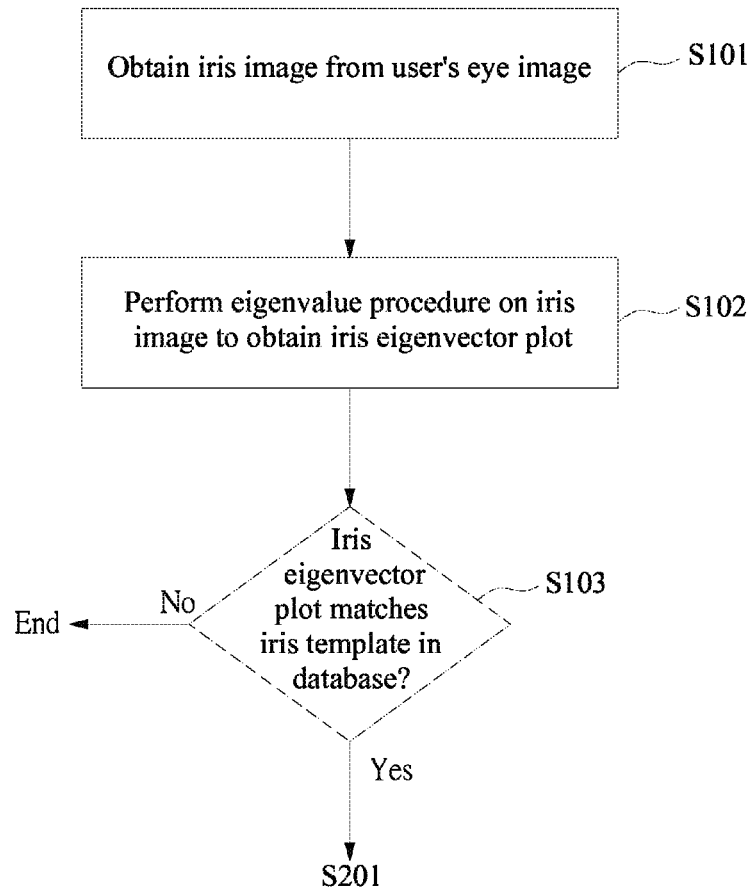

In one preferred embodiment, iris recognition is performed prior to the password input process in order to verify the user's identity. Referring to FIG. 14, step S201 of the eye-controlled password input method of the present invention is preceded by the steps of: obtaining an iris image from the user's eye image (step S101); performing an eigenvalue procedure on the iris image to obtain an iris eigenvector plot (step S102); and comparing the iris eigenvector plot against a plurality of preset iris templates pre-stored in a database (step S103). If the comparison result is a match, step S201 is executed to start the password input process; otherwise, the password input process is left unexecuted.

Figure 15:
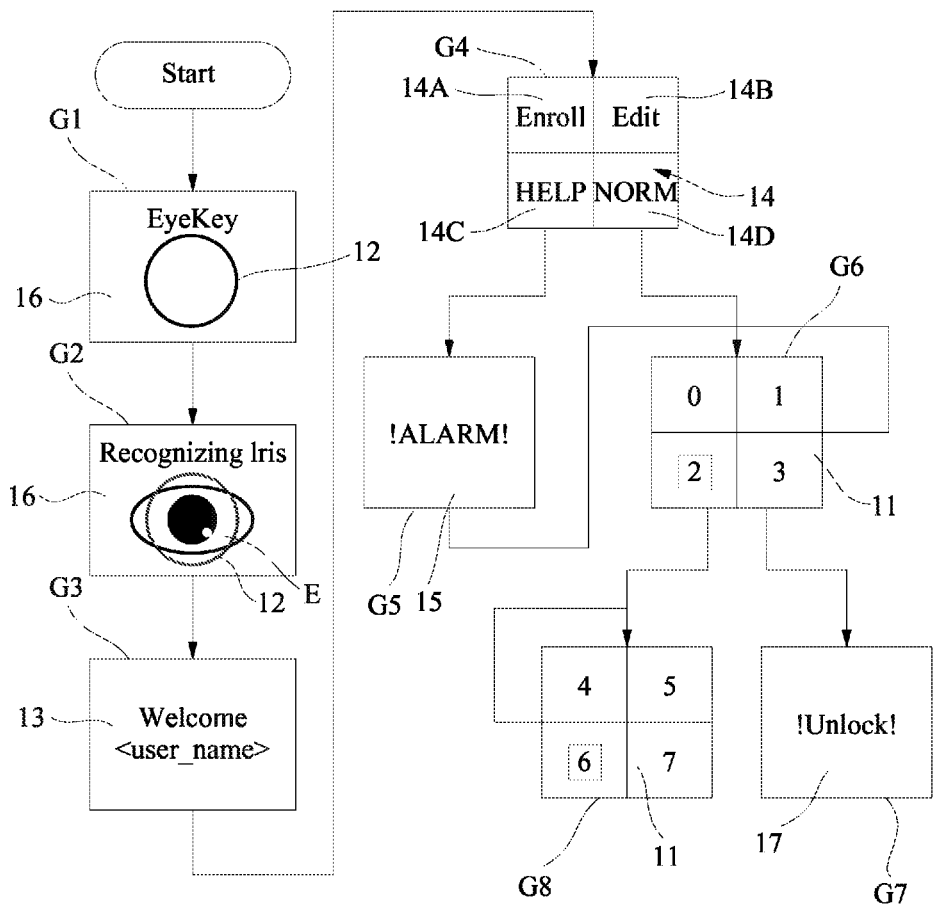
FIG. 15 is an operation flow chart of the eye-controlled password input apparatus of the present invention.

To better demonstrate the technical content of the present invention, the following paragraphs provide a detailed description as to how to operate the user interface of the present invention. It should be understood, however, that the disclosed user interface is but one embodiment for reference. Please refer to FIG. 15 for a schematic flowchart of the operation of the eye-controlled password input apparatus of the present invention. G1 to G8 in FIG. 15 are screen images displayed by the display device 10 during operation and correspond to certain steps respectively.

Once the eye-controlled password input apparatus 100 is activated by a user, the following process begins. (The process can be so designed that it is terminated after the user leaves or when specific conditions are met, and the apparatus is brought to a dormant state along with the termination of the process.) To start with, iris detection is conducted. The display device 10 displays an iris detection interface 16, and an iris detection zone 12 (G1) is shown at the center of the interface so that the user can aim with ease. The image capturing device 20 then takes an image of the user's eye and displays the eye image on the iris detection interface 16, allowing the user to center the eye in the iris detection zone 12 and the apparatus to obtain the user's iris features E (G2).

Once the iris features E are obtained, they are compared against the iris feature data pre-stored in the memory unit. If the comparison result is a match, meaning the user is verified as an authorized user, the display device 10 displays a pre-stored welcome screen 13 to start the password input process (G3); otherwise, the password input process remains unexecuted. Following the welcome screen 13, a user menu 14 (G4) is shown on the display device. The user menu 14 includes a HELP option 14C and a NORM option 14D (for starting password input). When in danger, the user can gaze at the HELP option 14C for help, and a warning signal 15 (G5) will be shown on the display device 10 and sent to the backend of the system. If the user gazes at the NORM option 14D, the password menu screen 11 (G6) will be displayed. The user menu 14 further includes an Enroll option 14A and an Edit option 14B if the user is identified in the iris recognition step as a system administrator. The Enroll option and the Edit option enable a system administrator to log in and edit respectively. The password menu 11 is divided into four sections, wherein one of the sections shows the $N^{th}$ character of the preset password whereas the other three sections show the $N^{th}$ characters of three random passwords respectively. Operation of the password menu 11 has been disclosed above and will not be stated repeatedly. If the password input by the user is correct, an unlocking screen 17 (G7) will be displayed; otherwise, password menu with random, incorrect characters (G8) will be successively shown until the user logs out (e.g., by putting his or her face away from the handheld input device). A password menu containing the first character of the preset password among the first characters of three random passwords will be shown when the user restarts the password input process.

The steps of the method disclosed herein may be implemented as software or computer programs and stored in an optical disc, hard disk drive, semiconductor memory device, or other computer-readable recording medium, through which the software or computer programs can be loaded to and accessed by an electronic device such as a safe with an electronic lock, the access control system or security system of a building, or like electronic devices or apparatuses.

To sum up, the present invention provides an interface through which a user can make eye-controlled input by looking selectively at different portions (i.e., the plural display areas) of a password menu. The present invention also discloses obtaining a plurality of reference objects from the user's eye images and analyzing the relative positions of the reference objects in order to determine the direction of the user's eye movement. Once the eye movement direction is known, the display area, and consequently the content the user wishes to input, can be identified and inputted. In some embodiments of the present invention, the direction of the user's gaze can be obtained without having to map the user's line of sight to the coordinate system of the password menu through coordinate conversion. As a result, the algorithm required is simple, and computing speed is high. Some embodiments of the present invention further provide an operation interface for, and a mode of operation of, eye-controlled devices. The operation interface and the mode of operation are so designed that the input screen will change automatically according to the user's password input so as to reduce the complexity of options and minimize the chances of misjudgment.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

The invention claimed is:

1. An eye-controlled password input apparatus, comprising:
  a display device for displaying a password menu divided into a plurality of display areas located at different positions, each of said display areas corresponding to_each of input password characters in the password menu;
  an image capturing device for taking an eye image of a user;
  a memory unit for storing at least one preset password and a corresponding account number;
  a control unit for generating the password menu according to each character of the preset password; and
  an image processing unit for obtaining a plurality of reference objects from the eye image and generating an eye movement direction according to the reference objects;
  wherein the image processing unit selects a corresponding display area according to the eye movement direction and thereby inputs one of said input password character; and
  wherein after the image processing unit inputs one of said input password character, the control unit automatically generates another one of the password menu on the display device according to next one of character in the preset password in order for the user to determine another one of input password character until a password input process is completed;
  wherein each said input password character is compared with a corresponding said character of the preset password, and if a said input password character does not match the corresponding character of the preset password, a current said password menu is automatically replaced by a next said password menu which does not show a corresponding said character of the preset password, nor will subsequent said password menu screens show corresponding said characters of the preset password respectively.

2. The eye-controlled password input apparatus of claim 1, wherein the reference objects comprise a pupil center and an eye perimeter, and the image processing unit generates the eye movement direction by analyzing a relative position of the pupil center with respect to the eye perimeter.

3. The eye-controlled password input apparatus of claim 1, wherein the reference objects comprise a pupil center and a light spot, and the image processing unit generates the eye movement direction by analyzing a relative position of the pupil center with respect to the light spot.

4. The eye-controlled password input apparatus of claim 1, wherein the reference objects comprise a pupil center, a first light spot, and a second light spot, and the image processing unit calculates an area parameter and an angle parameter by analyzing the pupil center, the first light spot, and the second light spot and generates the eye movement direction according to the area parameter and the angle parameter.

5. The eye-controlled password input apparatus of claim 3, further comprising an auxiliary light source device for illuminating an eye of the user so as to generate the light spot on a surface of the user's eye.

6. The eye-controlled password input apparatus of claim 1, wherein the control unit generates at least one random password different from the preset password and simultaneously displays a character of the preset password and a corresponding character of the random password in the display areas of a corresponding said password menu.

7. The eye-controlled password input apparatus of claim 6, wherein each said input password character is compared with a corresponding said character of the preset password; if a said input password character matches the corresponding character of the preset password, a current said password menu is automatically replaced by a next said password menu in order to enable subsequent input and comparison; and if all said input password characters sequentially match the characters of the preset password, the eye-controlled password input apparatus activates an unlocking operation.

8. The eye-controlled password input apparatus of claim 1, further comprising a handheld eye movement input device, wherein the handheld eye movement input device comprises a housing, a receiving space provided in the housing and configured for receiving the display device and the image capturing device, a master device containing the control unit, and a transmission line for data transmission between the master device and the display device or the image capturing device.

9. The eye-controlled password input apparatus of claim 1, wherein the eye image includes an iris image, the memory unit pre-stores a plurality of iris templates, and the image processing unit compares the iris image against the iris templates and, if the iris image matches one of the iris templates, enables the display device to display a first said password menu.

10. An eye-controlled password input method by which a password input process is performed, comprising the steps of:
  (a) generating a password menu according to each character of preset password, and displaying the password menu on a display device, wherein the password menu is divided into a plurality of display areas located at different positions, and each of said display areas corresponds to each of an input password characters in the password menu;
  (b) taking an eye image of a user with an image capturing device, obtaining a plurality of reference objects from the eye image, and generating an eye movement direction according to the reference objects;
  (c) selecting one of the display areas according to the eye movement direction, and thereby inputting a said input password characters in the password menu;
  (d) generating automatically another_one of the password menu according to next one of character of the preset password in the step (c) in order for the user to determine another one of said input password character; and
  (e) repeating the steps (c) and (d) until the password input process is completed;
  wherein each said input password character is compared with a corresponding character of the preset password, and if a said input password character does not match the corresponding character of the preset password, a current said password menu is automatically replaced by a next said password menu which does not show a corresponding said character of the preset password, nor will subsequent said password menu show corresponding said characters of the preset password respectively.

11. The method of claim 10, wherein the step (b) further comprises the steps of:
  searching for a pupil center in the eye image, and defining the pupil center as a first reference object;

searching for a top end, a bottom end, a left end, and a right end of an eye in the eye image, generating with these ends a eye perimeter that encloses the eye, and defining the eye perimeter as a second reference object; and analyzing a relative position of the pupil center with respect to the eye perimeter to generate the eye movement direction.

12. The method of claim 10, wherein the step (b) further comprises the steps of:
searching for a pupil center in the eye image, and defining the pupil center as a first reference object;
searching for a light spot in the eye image, and defining the light spot as a second reference object; and
analyzing a relative position of the pupil center with respect to the light spot to generate the eye movement direction.

13. The method of claim 12, wherein the step of generating the eye movement direction further comprises the steps of:
defining a baseline passing through the pupil center;
generating a connecting line connecting the pupil center and the light spot, and measuring an included angle between the baseline and the connecting line; and
determining the relative position of the pupil center with respect to the light spot according to the included angle.

14. The method of claim 10, wherein the step (b) further comprises the steps of:
searching for a pupil center, a first light spot, and a second light spot in the eye image, and defining the pupil center, the first light spot, and the second light spot as the reference objects;
obtaining an area parameter according to the reference objects;
obtaining an angle parameter according to the reference objects; and
analyzing a geometric relationship between the area parameter and the angle parameter to generate the eye movement direction.

15. The method of claim 14, wherein the step of obtaining the area parameter further comprises the steps of:
obtaining coordinates of the pupil center, coordinates of the first light spot, and coordinates of the second light spot, and calculating the area of a triangle defined by the three sets of coordinates; and
dividing the area by a normalization factor to obtain the area parameter.

16. The method of claim 14, wherein the step of obtaining the angle parameter further comprises the steps of:
defining a baseline passing through the pupil center;
generating a first connecting line between the pupil center and the first light spot, and measuring a first included angle between the baseline and the first connecting line;
generating a second connecting line between the pupil center and the second light spot, and measuring a second included angle between the baseline and the second connecting line; and
generating the angle parameter according to the first included angle and the second included angle.

17. The method of claim 10, further comprising the steps, to be performed prior to the step (a), of:
obtaining an iris image from the eye image;
performing an eigenvalue procedure on the iris image to obtain an iris eigenvector plot; and
comparing the iris eigenvector plot against a plurality of iris templates, and starting the password input process from the step (a) if the iris eigenvector plot matches one of the iris templates, or leaving the password input process unexecuted if otherwise.

18. The method of claim 10, wherein the step (a) further comprises the steps of:
generating at least one random password different from the preset password; and
displaying simultaneously a character of the preset password and a corresponding character of the random password in the display areas of a corresponding said password menu.

19. The method of claim 10, wherein each said input password character is compared with a corresponding character of the preset password; if a said input password character matches the corresponding character of the preset password, a current said password menu is automatically replaced by a next said password menu in order to enable subsequent input and comparison; and if all said input password characters sequentially match the characters of the preset password, an unlocking operation is performed.

20. A non-transitory computer readable medium, which is loadable and executable by a computer to execute the method of claim 10.

21. A computer program product is stored in a non-transitory computer readable medium, which is loadable and executable by a computer to execute the method of claim 10.

* * * * *